(12) United States Patent
Drabbels et al.

(10) Patent No.: US 8,900,039 B2
(45) Date of Patent: Dec. 2, 2014

(54) ORGAN REMOVAL DEVICE AND A METHOD FOR ORGAN REMOVAL

(71) Applicant: Marel Stork Poultry Processing B.V., Boxmeer (NL)

(72) Inventors: Bastiaan Wilhelmina Johannes Elizeus Josephus Drabbels, Vierlingsbeek (NL); Erik Hendrikus Werner Peters, Boxmeer (NL); Maarten Leonardus Van Oss, Heumen (NL)

(73) Assignee: Marel Stork Poultry Processing B.V., Boxmeer (NL)

( * ) Notice: Subject to any disclaimer, the term of this patent is extended or adjusted under 35 U.S.C. 154(b) by 0 days.

(21) Appl. No.: 14/351,063

(22) PCT Filed: Nov. 8, 2012

(86) PCT No.: PCT/NL2012/050788
§ 371 (c)(1),
(2), (4) Date: Apr. 10, 2014

(87) PCT Pub. No.: WO2013/073936
PCT Pub. Date: May 23, 2013

(65) Prior Publication Data
US 2014/0256241 A1   Sep. 11, 2014

(30) Foreign Application Priority Data

Nov. 15, 2011  (NL) .................................. 2007786

(51) Int. Cl.
A22C 25/14   (2006.01)
A22C 21/06   (2006.01)
A22C 21/00   (2006.01)

(52) U.S. Cl.
CPC ............. *A22C 21/06* (2013.01); *A22C 21/0046* (2013.01)
USPC ........................................................ 452/116

(58) Field of Classification Search
USPC .......................... 452/106, 107, 116–119, 123
See application file for complete search history.

(56) References Cited

U.S. PATENT DOCUMENTS

| | | | |
|---|---|---|---|
| 3,451,097 A * | 6/1969 | Knight | 452/116 |
| 3,802,028 A | 4/1974 | Scheier et al. | |
| 4,004,320 A | 1/1977 | Scheier et al. | |
| 4,575,426 A * | 3/1986 | Littlejohn et al. | 210/671 |
| 5,873,744 A * | 2/1999 | Ramos, Jr. | 439/144 |
| 5,980,376 A * | 11/1999 | Grosseholz et al. | 452/116 |
| 6,165,062 A | 12/2000 | Martin et al. | |
| 7,427,229 B2 * | 9/2008 | Grosseholz et al. | 452/106 |
| 7,959,499 B2 * | 6/2011 | Chattin et al. | 452/116 |
| 2009/0203303 A1 | 8/2009 | Chattin et al. | |

FOREIGN PATENT DOCUMENTS

WO  WO 98/47379 A2  10/1998

* cited by examiner

*Primary Examiner* — Richard Price, Jr.
(74) *Attorney, Agent, or Firm* — Birch, Stewart, Kolasch & Birch, LLP

(57) ABSTRACT

An organ removal device and a method are provided for removing one or more organs or parts thereof located adjacent the spinal column of the carcass on opposite sides thereof from the wall of a body cavity of slaughtered eviscerated poultry having an access opening to the body cavity thereof. The device includes a poultry support device and a vacuum tube assembly comprising two vacuum tubes, each having at least one suction nozzle at an end thereof, the vacuum tube assembly further includes two scrapers, each arranged to scrape along a region of the wall of the body cavity to loosen organs adhering to the wall. A sweeping mechanism is provided to impart to each scraper a sweeping motion away and/or towards the spinal column.

17 Claims, 17 Drawing Sheets

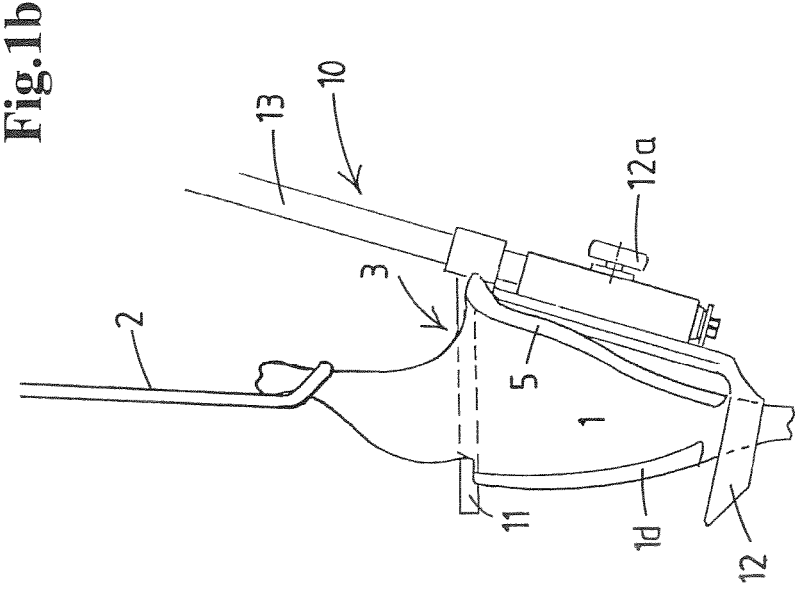
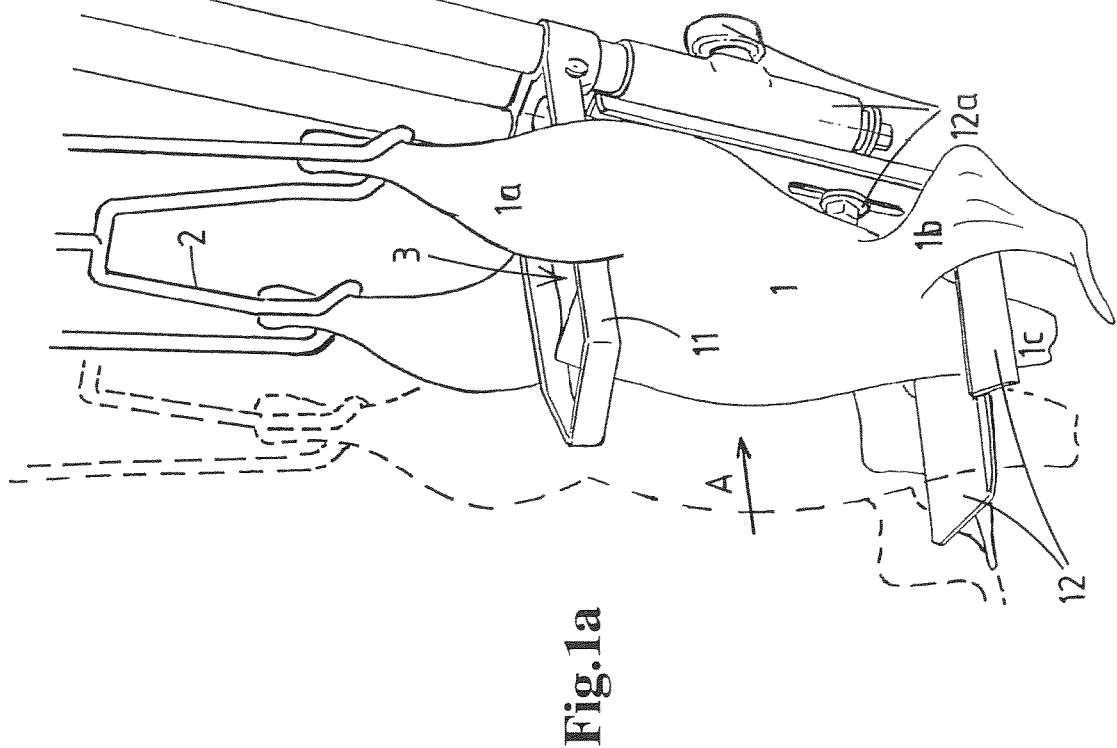

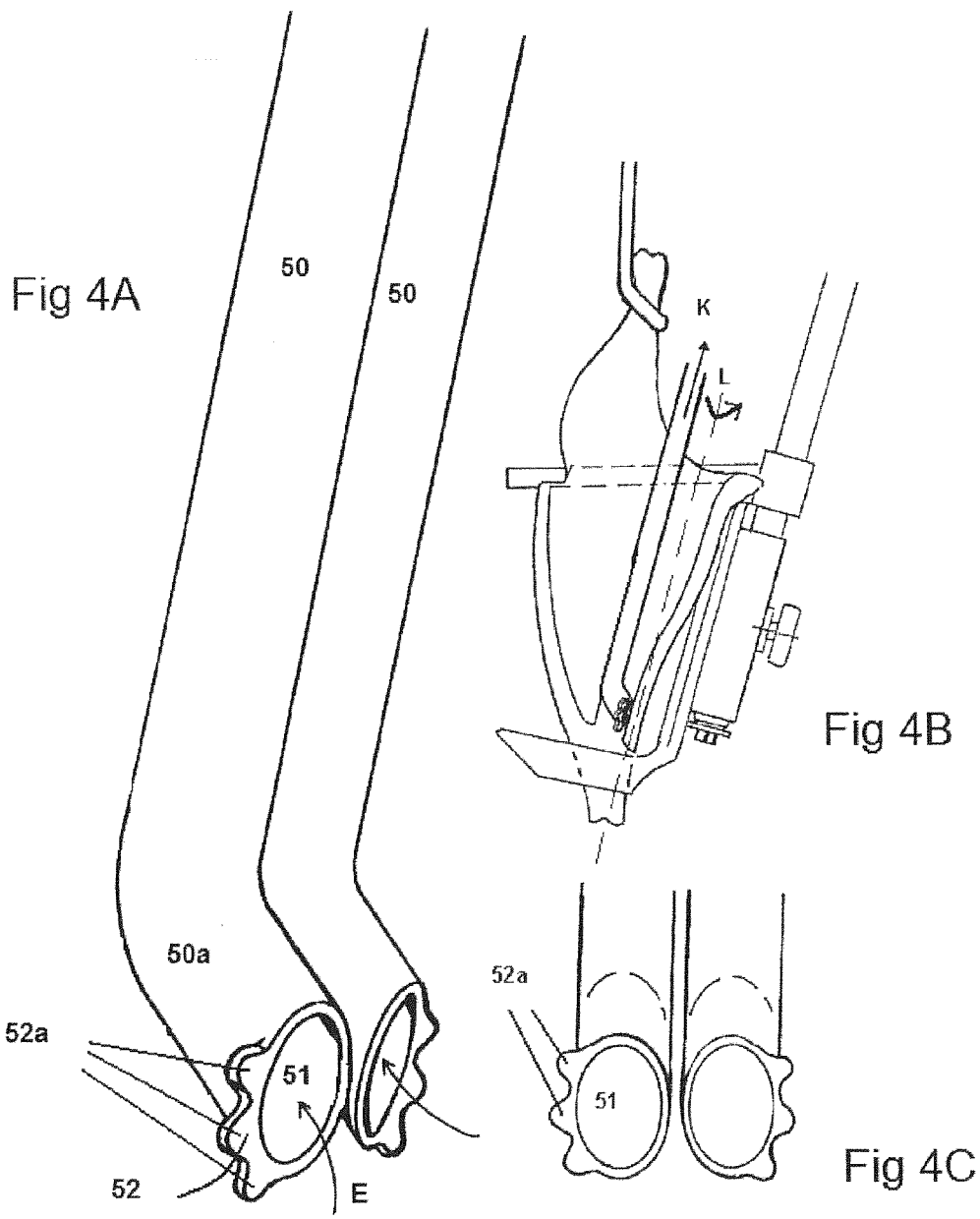

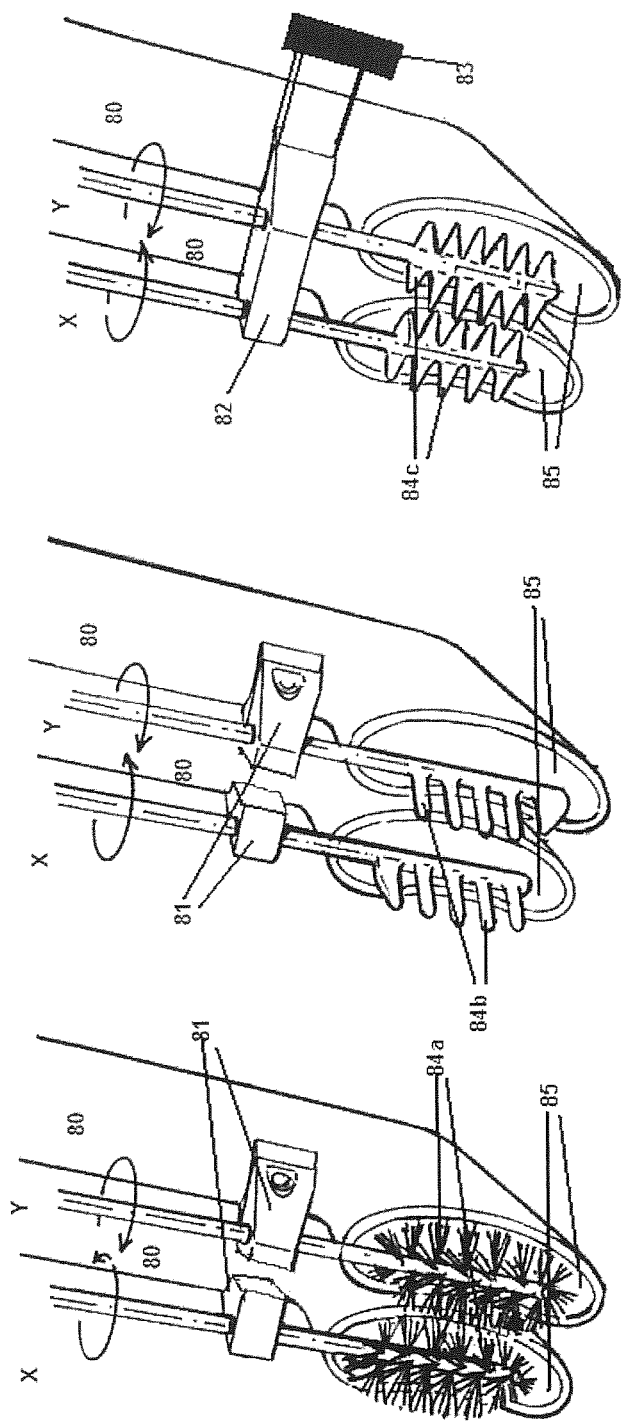

ORGAN REMOVAL DEVICE AND A METHOD FOR ORGAN REMOVAL

The present invention relates to organ removal device for removing one or more organs or parts thereof located adjacent the spinal column of the carcass on opposite sides thereof from the wall of a body cavity of slaughtered eviscerated poultry having an access opening to the body cavity thereof.

During the slaughtering of poultry for processing into food, the internal organs, such as the kidneys and lungs are required to be removed from the carcass completely, otherwise there is a product rejection and/or a need for reprocessing of that carcass. The lungs and kidneys of a poultry carcass are disposed in the body cavity adjacent the wall on opposite sides of the spinal column in sockets covered with a tissue film or membrane. Of course, it is important that these organs be dislodged and removed from the carcass during the evisceration process. However, removal of organs disposed within membrane-covered sockets with conventional evisceration devices presents several problems, as will be set forth hereinbelow.

Conventional processing devices often utilize a large eviscerating tool, such as a spoon, for scooping the organs and entrails from the body cavity of a poultry carcass. Typically, the tool is inserted through a previously cut abdominal access opening in the carcass and into the body cavity, wherein the tool applies pressure on the viscera in a direction away from the breasts and drags the viscera along the spinal column and out of the carcass. The tool is usually designed to grab and pull the heart, which is relatively exposed within the cavity in a position readily accessible by the tool. It is expected that the blood vessels interconnecting the heart and lungs will cause the lungs to be pulled by the tool and removed from the cavity, along with the heart.

This type of evisceration device generally does not remove all organs. The membrane covering the lungs, unless broken, will often prevent removal of the lungs. The spoon-like tool does not effectively and reliably break the membrane covering the lungs. Although the pulling force exerted on the vessels interconnecting the heart and lungs may be sufficient to tear the membrane as the lungs are pulled from their respective sockets, the vessels have a tendency to tear, in which case the lungs remain in the sockets. Even if the vessels remain intact, the lungs have a tendency to tear, whereby a portion of the lung may be left in the socket.

Organ removal devices have been specifically designed for removing one or more organs or parts thereof located adjacent the spinal column of the carcass on opposite sides thereof, in particular lungs or kidneys, from the wall of a body cavity of slaughtered eviscerated poultry having an access opening to the body cavity thereof.

Conventional organ removal devices typically include:
 a poultry support device for supporting and positioning the access opening and the spinal column of the poultry,
 a vacuum tube assembly comprising two vacuum tubes, each having at least one suction nozzle at an end thereof, the vacuum tube assembly further comprising two scrapers, each arranged to scrape along a region of the wall of the body cavity to loosen organs adhering to said wall, said regions being located on opposite sides of the spinal column, the scrapers being provided adjacent the nozzles,
 a vacuum tube assembly actuator for moving the vacuum tube assembly into and out of said body cavity through said access opening,
 a source of vacuum pressure communicating with the vacuum tubes to suck the one or more organs via the nozzles into the tube.

A preferred type of source of vacuum pressure is a vacuum pump. Preferably, the vacuum pressure is controlled so as to prevent inadvertent removal or damage of other organs or body parts. Preferably, the source of vacuum pressure and intake openings are not intercommunicated until the latter are positioned over the organs. Moreover, the vacuum pressure must be amply low to prevent removal or damage to the carcass and body parts surrounding the sockets. In some instances, however, the vacuum pressure tends to be insufficient to break the membrane covering the lungs.

As disclosed for example in U.S. Pat. No. 3,802,028 and U.S. Pat. No. 4,004,320 vacuum tools have been provided with scrapers projecting outwardly in locations adjacent the intake openings for scraping the carcass on opposite sides of the spinal column. These tools are reciprocated along a generally vertical path of travel within the body cavity, with the scrapers contacting and scraping along the membranes. Accordingly, the scrapers are provided to rip and tear the membrane for facilitating removal of the lungs.

However, these lung removal devices also present several problems. Particularly, the scrapers tend to mutilate the lungs so that the lungs are not sucked whole from the socket, whereby fragments of the lung often remain in the body cavity. The scrapers also have a tendency to damage the carcass surrounding the sockets, which is unsightly and adverse to the salability of the bird. Furthermore, the force of the scrapers along the backside of the carcass often breaks the bones in close proximity to the sockets (i.e., the ribs). Broken bones and splintered bone chips are dangerous to consumers and are also unsightly and adverse to salability of the bird.

Responsive to these problems, the object of the present invention is to provide an improved organ removal device for effectively and reliably removing organs from a membrane-covered socket in the body cavity of a poultry carcass. Preferably, the device is provided in a high speed, mechanized poultry processing system. In particular, it is preferred that the device does not damage or break the body parts surrounding the socket, so that the process of removing the organs does not adversely affect the appearance or salability of the bird.

According to the invention, the object is achieved in that a sweeping mechanism is provided adapted to impart to each scraper a, possibly repeated, sweeping motion away and/or towards the spinal column.

Thus, the scrapers do not scrape in the direction of the spinal column, perpendicular to the ribs, but away and towards the spinal column, which is generally parallel to the ribs. By scraping in the direction of the ribs, damage of the ribs and adjacent parts of the carcass and mutilation of the lungs is prevented. This sweeping motion of the scrapers, in combination with the adjacent nozzle(s) to direct the detached organs into the vacuum tube effectively dislodges and removes the organs. Preferably, the sweeping motion is essentially perpendicular to the spinal column, from the spinal column towards the sides or vice versa.

It is noted that the organ removal device according to the invention will not only remove remaining organs such as lungs and kidneys, but also parts of organs such as heart, lungs, crop, intestines, gizzard which are still present, as well as body fluids.

The organ removal device according to the present invention is preferably positioned adjacent a conveying path, along which the slaughtered birds travel. Prior to the organ removal device, the poultry has been killed and defeathered. Preferably, the neck has been removed. Further, an access opening (vent opening) must have been provided to enter the body cavity, through which opening evisceration has taken place. Thus, the body cavity is essentially emptied, but remainders of organs such as the lungs and kidneys are likely to be present adjacent and adhering to the walls of the body cavity. The organ removal device according to the invention is suitable for removing one or more organs being located adjacent the spinal column of the carcass on opposite sides thereof. Further along the conveying path, the poultry may be washed with water inside and outside.

The organ removal device according to the invention comprises a poultry support device for supporting and positioning the access opening and the spinal column of the poultry, to be able to accurately position the vacuum tube and the scrapers on opposite sides of the spinal column. Preferably, the bird is being conveyed hung by its legs. The poultry support device may then preferably comprise a shoulder support beneath the shoulders and a spreader device spreading the legs of the animal. Possibly, the relative position of shoulder support and spreader is adjustable.

According to the invention, a vacuum tube assembly is provided comprising vacuum tubes, suction nozzles and scrapers. Vacuum tubes comprising one or more suction nozzles are known from the prior art.

A suction nozzle according to the invention can be configured as an opening, generally an oval opening or vacuum port formed along a side at one end of the tube, through which the vacuum source can impart suction to the one or more organs. The opening can be made in the wall of the tube, near the end. Preferably, the suction nozzle is configured as a head end of the vacuum tube, which has been cut on the bias.

The scrapers are provided adjacent the nozzles, for scraping along a region of the wall of the body cavity to loosen organs adhering to said wall, said regions being located on opposite sides of the spinal column. Preferably, the scrapers direct the detached organs into the vacuum tube. At the end of the vacuum tube a container is provided for collecting the one or more organs or parts that are removed using the organ removal device of the invention. It is possible to position the scraper in front of the nozzle, e.g. by movably attaching the scrapers to the vacuum tubes. Alternatively, the scrapers are provided adjacent the tube portion defining the nozzle. Possibly, the scraper is provided stationary with respect to an associated vacuum tube, e.g. attached to, or formed integral with the tube portion defining the nozzle, such that the scraper is movable together with the tube and the nozzle. When the suction nozzle is configured as a head end of the vacuum tube, which has been cut on the bias, the scraper is preferably formed by protrusions provided at the end of the vacuum tube forming the nozzle.

According to the invention, a sweeping mechanism is provided adapted to impart to each scraper a, possibly repeated, sweeping motion away and/or towards the spinal column. The sweep preferably allows the scraper to scrape the back wall of the body cavity, preferably between 90° and 180° for both scrapers from the spinal column in the direction of the breast bone.

The sweeping mechanism comprises an individual drive mechanism or a drive mechanism coupled with the vacuum tube actuator. Preferably, a vacuum operated drive mechanism is provided using the same source of vacuum pressure imparting the suction. An alternative drive mechanisms is, for example, a pneumatic system pneumatially imparting a sweeping motion of the scrapers. Yet an alternative sweeping drive mechanism comprises protrusions guided in a guide, which impart a sweeping motion of the scrapers.

The sweeping motion of the scrapers is preferably achieved by rotating the scrapers along a rotational axis which is essentially parallel to the spinal column. Alternatively, the sweeping motion is a translational movement. It is preferred for the scrapers to sweep in opposite directions. However, it is also possible, though less preferred, to rotate the scrapers in the same direction.

In a preferred embodiment, the sweeping mechanism is movable between an entry modus wherein the scrapers are positioned such that they do not scrape during entering the body cavity, and an operational modus once the scrapers have moved into said body cavity, wherein the sweeping mechanism is able to impart to each scraper a sweeping motion. This may prevent damage of organs and ribs at the back wall by the scrapers during entry.

For example, in an embodiment where the scraper comprises protrusions, e.g. bristles, in the entry modus shielding means are provided to shield the protrusions. Alternatively, the scrapers may be configured such that entrance is possible when the sweeping mechanism has positioned the scrapers in an entry position in which the scrapers do not protrude, e.g. when the scrapers face each other during entry. Once having entered the body cavity, sweeping mechanism is moved in the operation modus allowing the scrapers to sweep away and/or towards the spinal column.

In a preferred embodiment the scrapers are provided stationary with respect to an associated vacuum tube, and the scrapers comprise protrusions protruding away from the nozzle of the vacuum tube. As such, in the operational modus the sweeping mechanism is adapted to rotate the vacuum tubes for sweeping the scrapers. In this embodiment, in the entry modus, the scrapers of the vacuum tubes are allowed to face each other during entry of the body cavity to prevent the scrapers from scraping during entry. As such, damage of the ribs and organs prior to positioning of the vacuum nozzles is prevented.

In a possible embodiment, the scrapers are provided stationary with respect to an associated vacuum tube, wherein the sweeping mechanism is adapted to rotate the vacuum tubes about their longitudinal axes for sweeping the scrapers. This enables a relatively easy configuration of the organ removal device.

In a possible embodiment, the vacuum tubes are curved over their length. In this embodiment, the vacuum tube may be rotated with the sweeping mechanism about a rotation axis adjacent the spinal column. As such the scrapers are allowed to move along the wall of the body cavity.

In an alternative embodiment, the scrapers are movably, preferably rotatably, attached to the vacuum tubes, and wherein the sweeping mechanism drives the scrapers. In an embodiment with rotatable scrapers which are movably attached to the tubes, the rotational axis of the scraper is spaced apart from the spinal column, at a distance corresponding to the dimension of the scraper such that the end of the scraping means touch the wall of the body cavity. The scraper may for example comprise a brush having bristles. The distance between the rotational axis of the scraper and the spinal column then preferably corresponds to the length of the bristles.

Preferably, the scraper comprises protrusions at essentially the same distance as the distance between the ribs of the bird, and wherein the ribs of the poultry are allowed to align with valleys between the protrusions. This distance is preferably between 2-6 mm, even more preferably between 3-4 mm. Thus, the poultry is allowed to move in a small extent to allow such alignment. As such, damage of the ribs is prevented even further and organ removal is further optimized. The protrusions may be relatively sharp or blunt, or alternatively comprise bristles. Even more preferably, the protrusions extend in the same direction.

In an embodiment, the protrusions extend in the same direction. When the scraper comprises multiple protrusions extending in different directions a sweep may be allowed to extend over a smaller angle, as different protrusions will scrape a different portion of the ribs. It is conceivable that multiple sweeps are performed before all organs are detached. The sweeping scrapers direct the detached organs into the nozzle of the vacuum tube, sucking the organs into the tube.

In an embodiment, the source of vacuum alternates the communication with the tubes to optimize performance.

In a preferred embodiment, the vacuum tube assembly further comprises a bracket extending essentially parallel to and adjacent the vacuum tubes, the tip of the bracket extending beyond the suction nozzles such that the tip of the bracket enters the access opening first, the bracket and vacuum tubes being arranged such that once the vacuum tube assembly has entered the body cavity the vacuum tubes are positioned between the bracket and the spinal column. An advantage of this bracket is that the tip of the bracket moves abundant flesh at the access opening to prevent the suction tubes from clogging with such flesh. Furthermore, the entry of the vacuum tube assembly may be facilitated. Furthermore, the bracket defines an open area behind the suction tubes, ensuring the supply of some air to the areas inside the body cavity where the vacuum has removed organs and air.

The invention further relates to a method for removing one or more organs or parts thereof located adjacent the spinal column of the carcass on opposite sides thereof from the wall of a body cavity of slaughtered eviscerated poultry having an access opening to the body cavity thereof using an organ removal device according to one or more of the preceding claims, wherein:

the access opening and the spinal column of the poultry are positioned by the poultry support device;

the vacuum tube assembly comprising at least one vacuum tube having at least one suction nozzle at an end thereof and at least two scrapers is allowed to access the body cavity through said access opening, such that the scrapers are disposed on opposite sides of the spinal column;

suction is imparted to the one or more organs via the nozzles, and a, possibly repeated, sweeping motion away and/or towards the spinal column is imparted to each scraper, the scrapers scraping along a region of the wall of the body cavity to loosen organs adhering to said wall, said regions being located on opposite sides of the spinal column, the vacuum tube is allowed to exit the body cavity.

Preferably, the scraper comprises protrusions at essentially the same distance as the distance between ribs, wherein the ribs of the poultry align with valleys between the protrusions.

Preferably, the scraper comprises protrusions that do not scrape during entering the body cavity and which protrusions sweep along the wall of the body cavity once the scrapers moved into said body cavity.

Preferably, two vacuum tubes are provided and wherein the source of vacuum alternates the communication with the tubes to optimize performance.

The invention is further elucidated with respect to the drawings, in which:

FIGS. 1a and 1b schematically represents a portion of an organ removal device according to the invention when the poultry is being positioned;

FIGS. 2a and 2b schematically represents a portion of an organ removal device according to the invention including the vacuum tube;

FIGS. 3a and 3b schematically represents a portion of an organ removal device according to the invention when the vacuum tube has entered the body cavity;

FIGS. 4a-4c show an alternative configuration of a vacuum tube and an organ removal device;

Figure 7A:
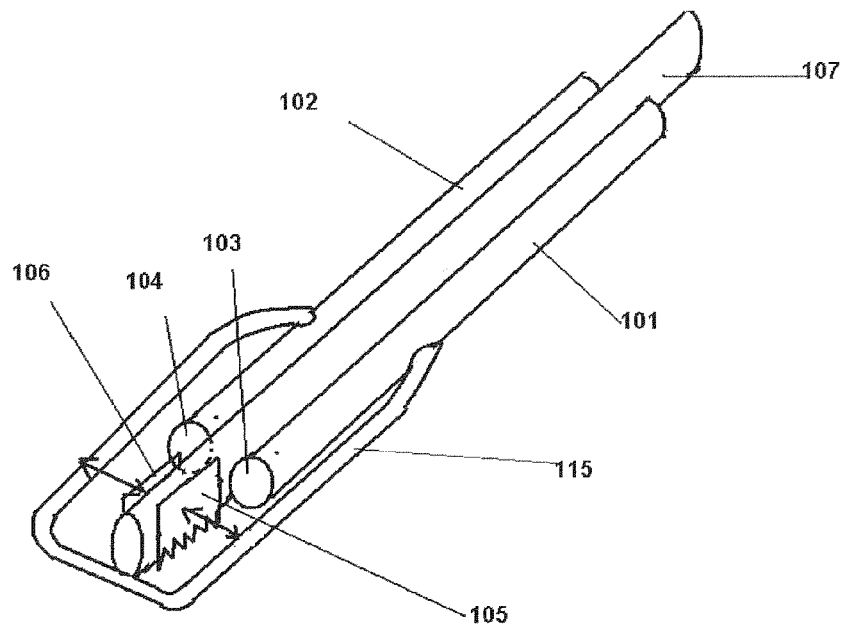
Figure 7B:
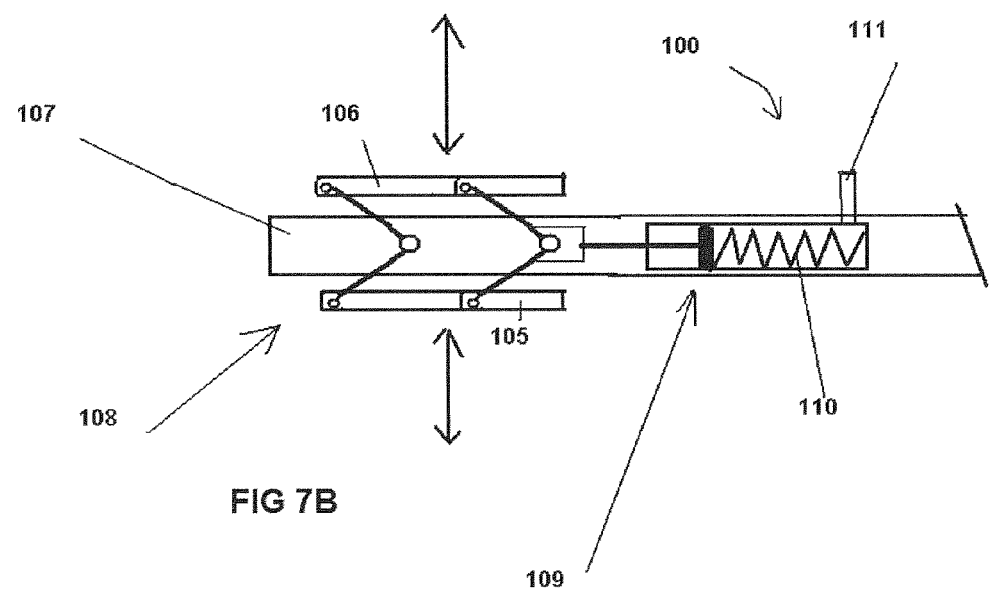
Figure 8A:
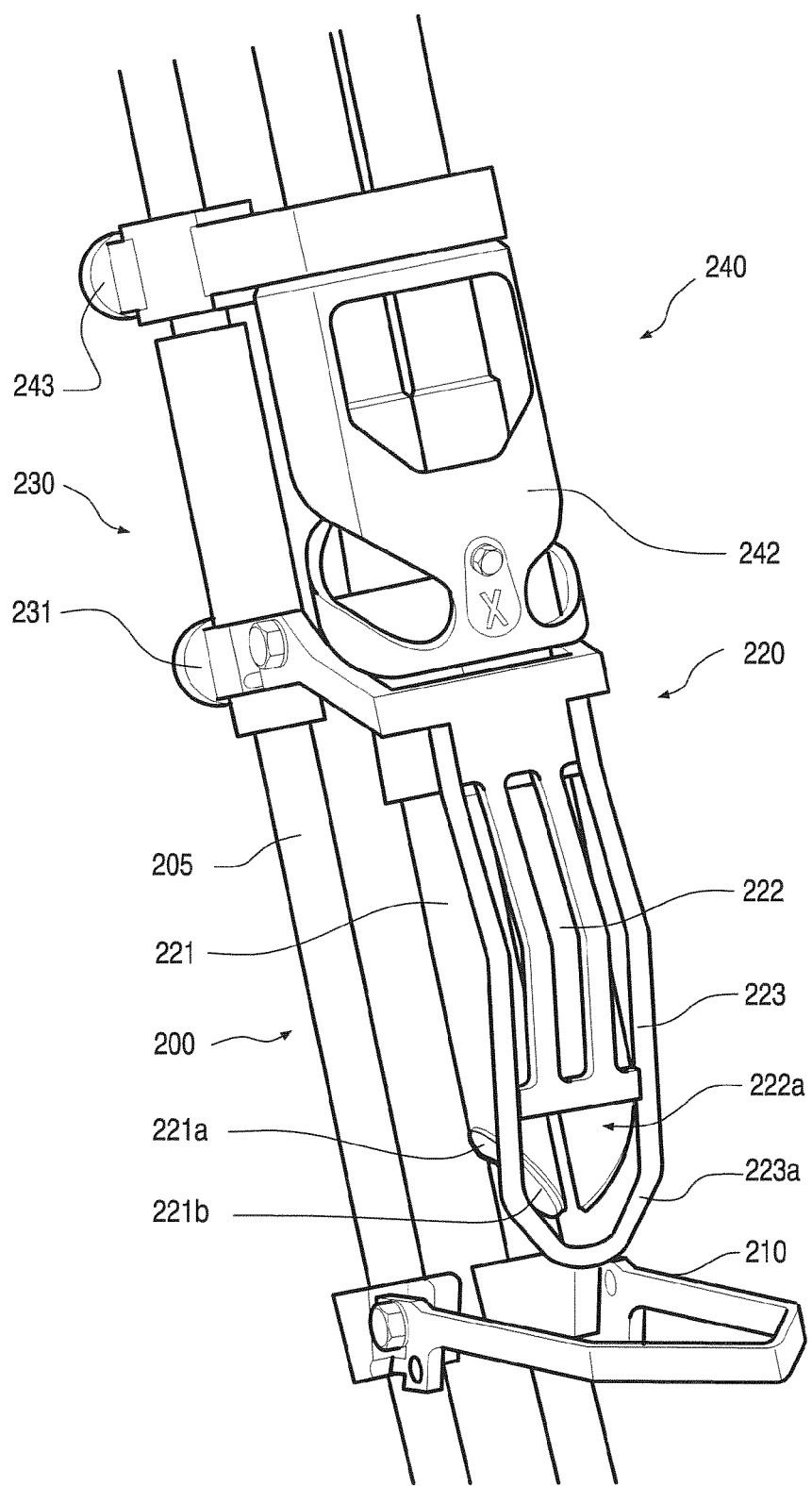
Figure 8B:
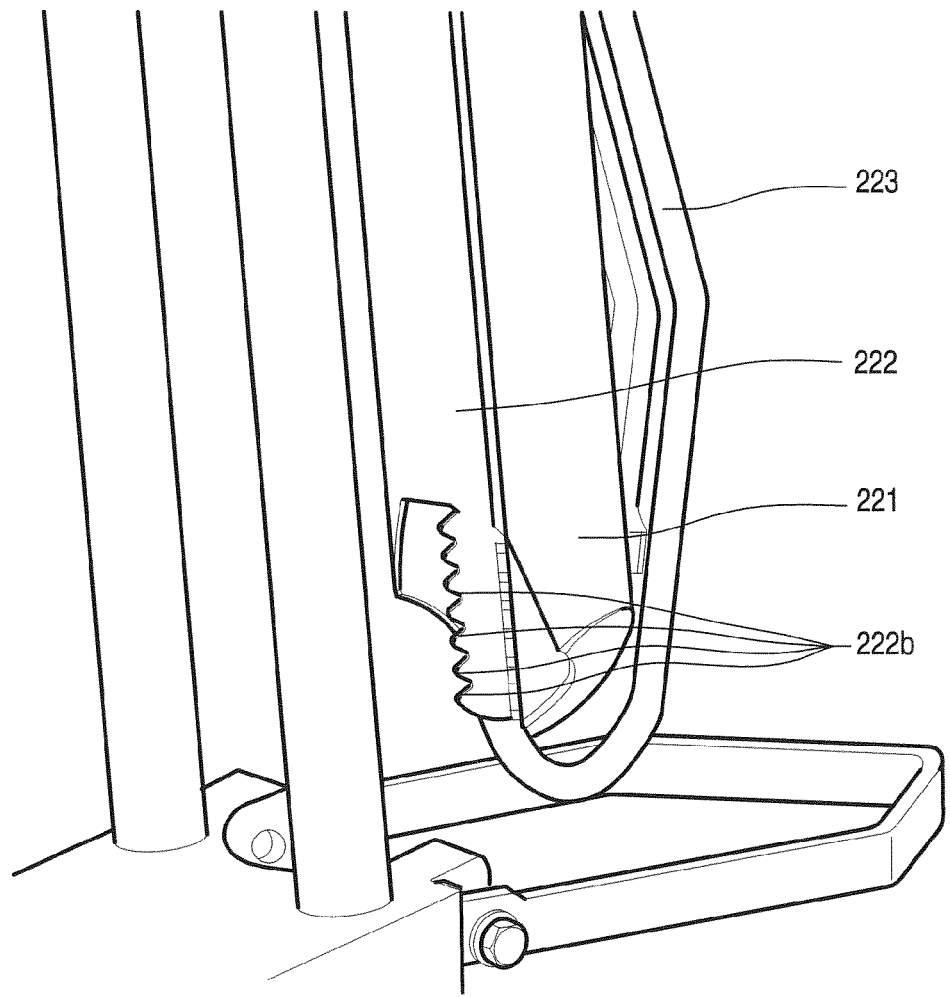
Figure 8C:
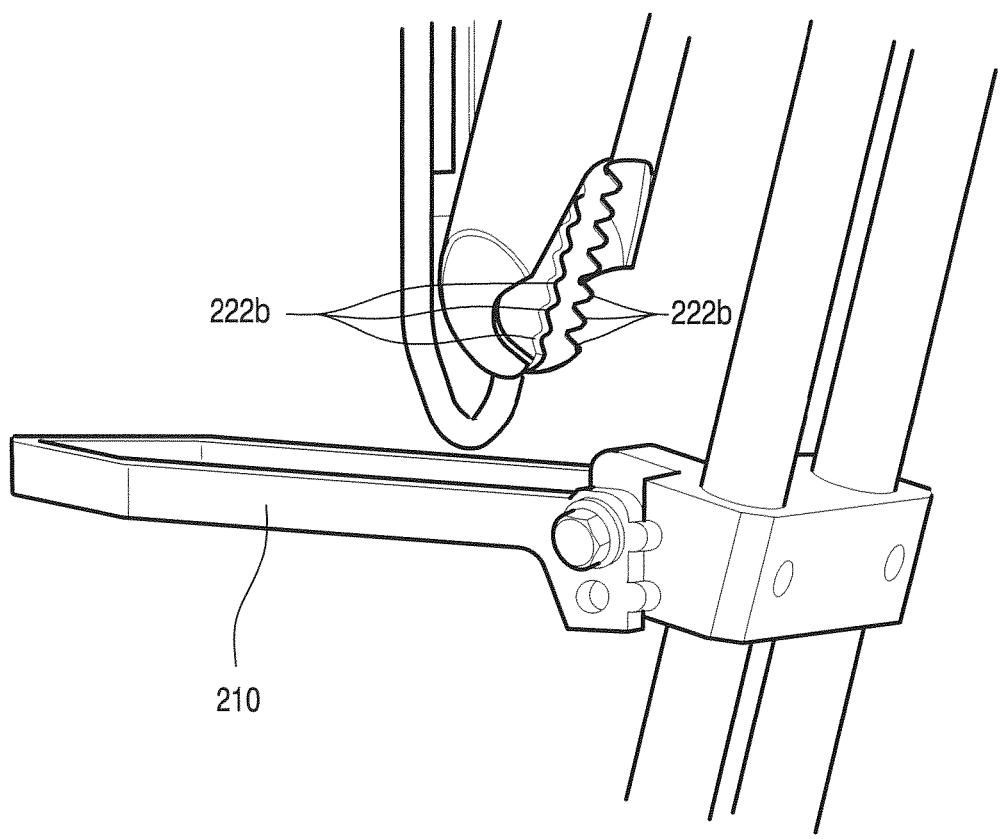
Figure 9:
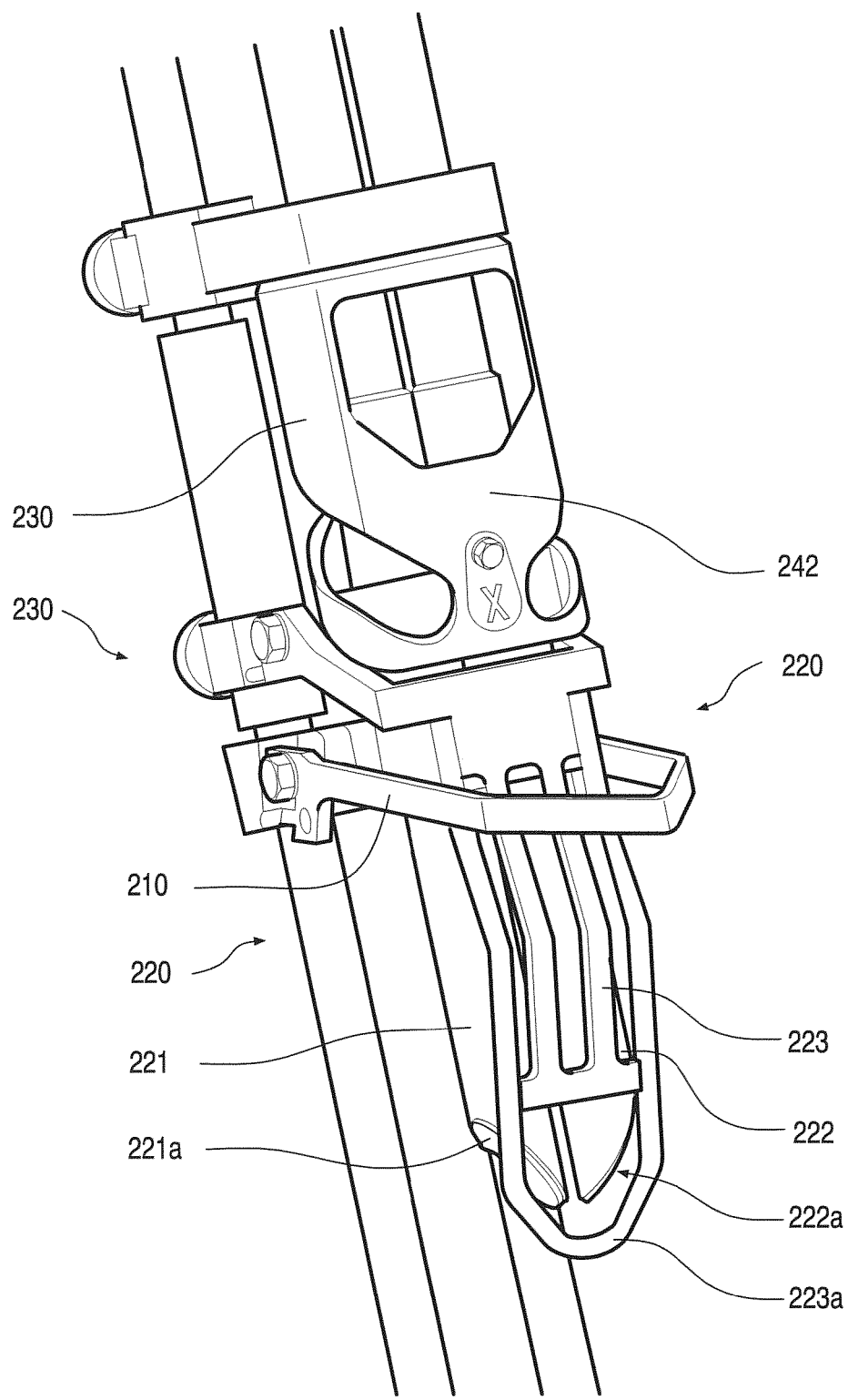
Figure 10A:
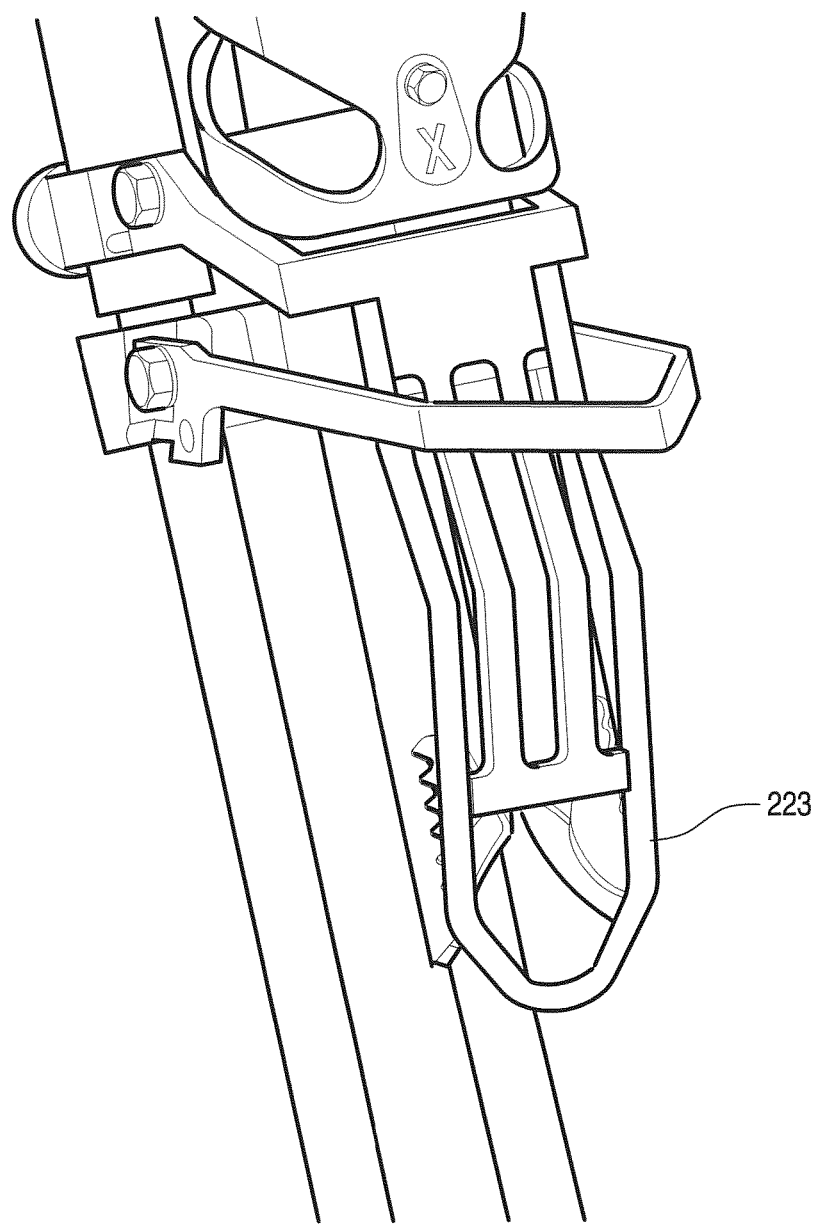
Figure 10B:
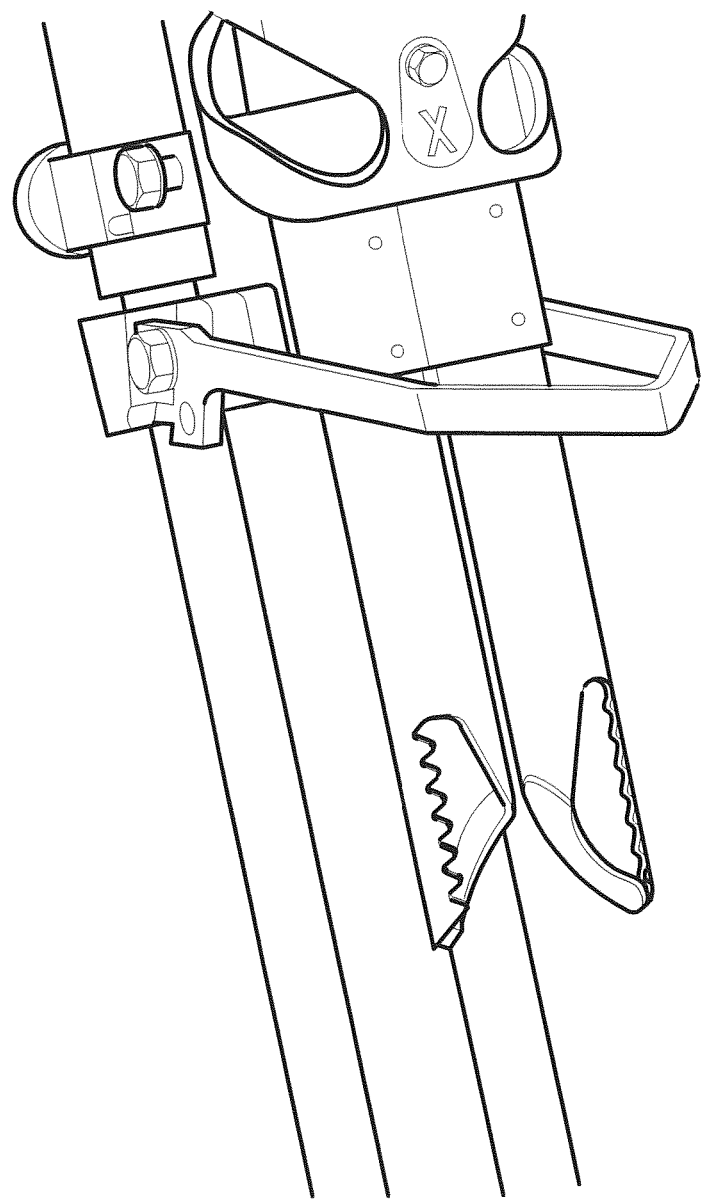
Figure 11:
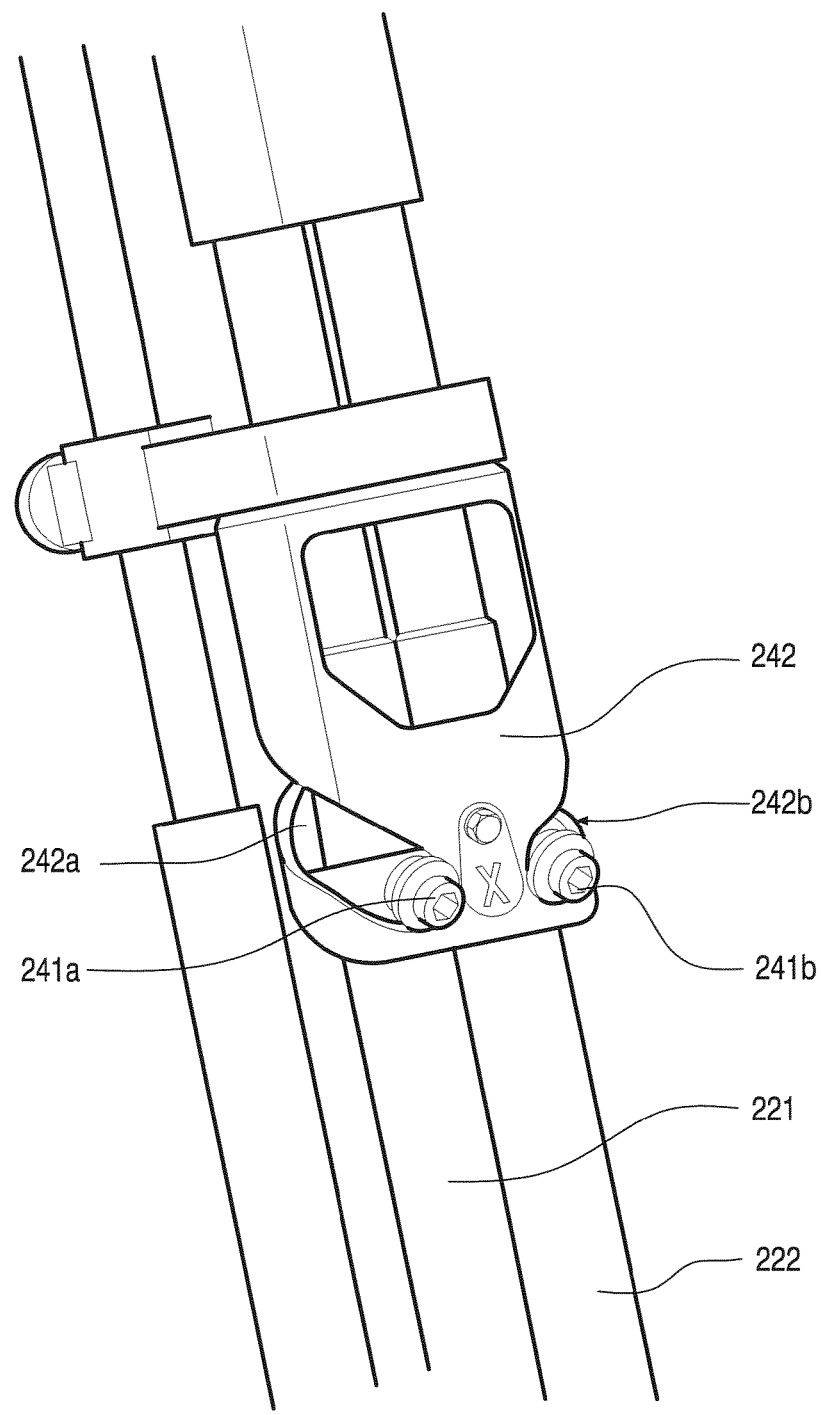
Figure 12:
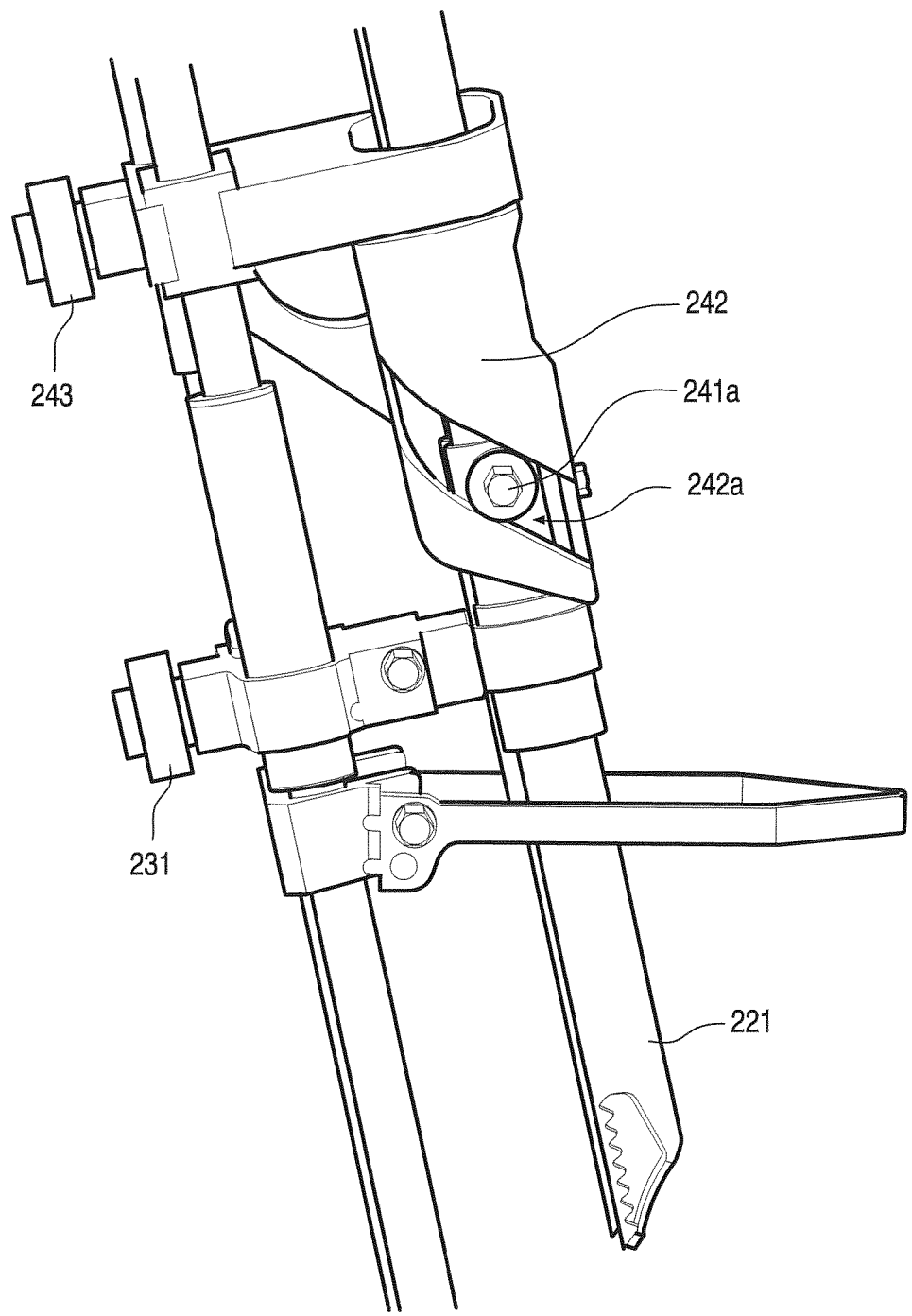
Figure 14:
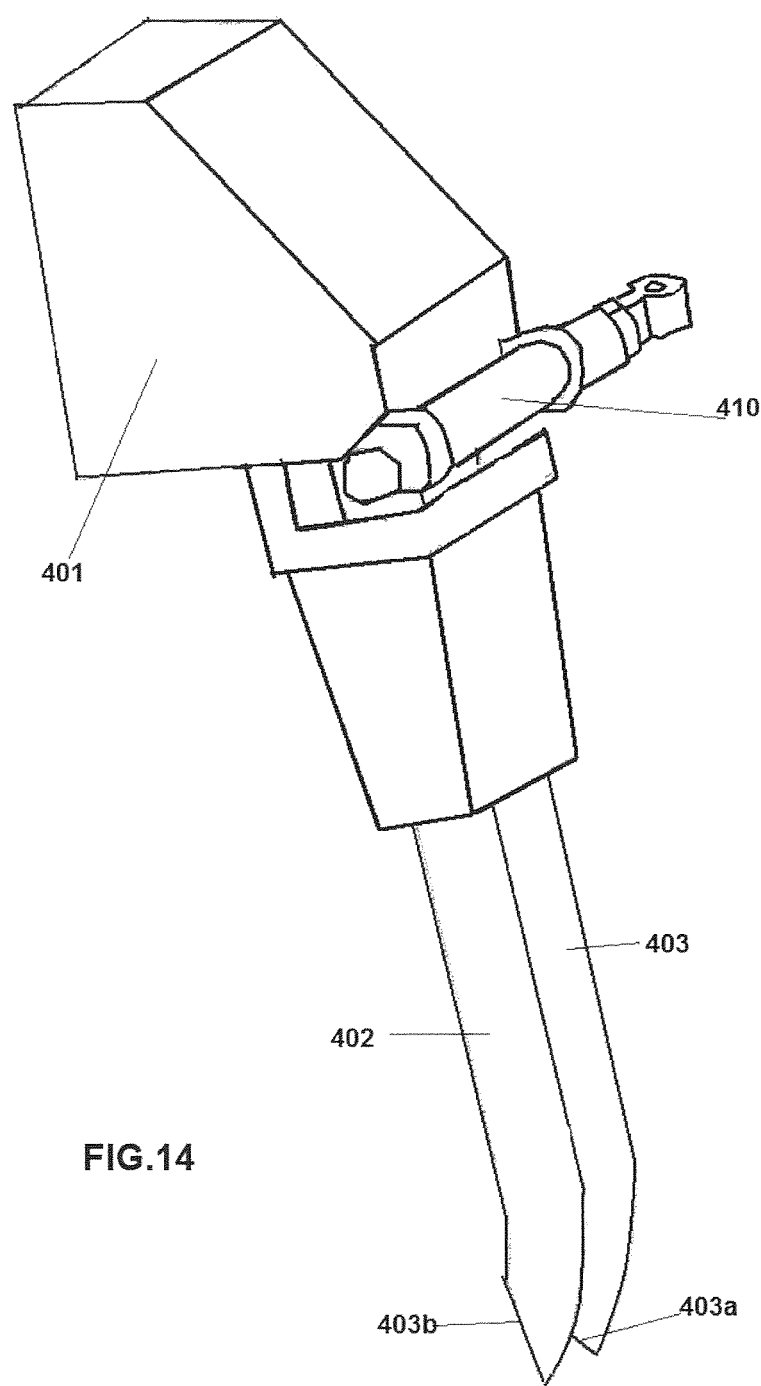

FIGS. 6a-c show yet alternative configurations of a vacuum tube;

FIGS. 7a-7b show yet alternative configurations of a portion of an organ removal device according to the invention;

FIG. 8a shows yet an alternative configuration of an organ removal device according to the invention;

FIGS. 8b and 8c show a detail of FIG. 8a in an enlarged view in different perspectives;

FIG. 9 shows the device of FIG. 8 in a different configuration;

FIG. 10a shows the device of FIG. 8 in a different configuration in detail;

FIG. 10b shows the same detail of FIG. 10a without the bracket;

FIGS. 11 and 12 show details of the sweeping mechanism of the organ removal device of FIG. 8;

FIGS. 13a-13d schematically show an example of a sweeping motion according to the present invention;

FIG. 14 shows yet an alternative configuration of an organ removal device according to the invention.

Figure 2A:
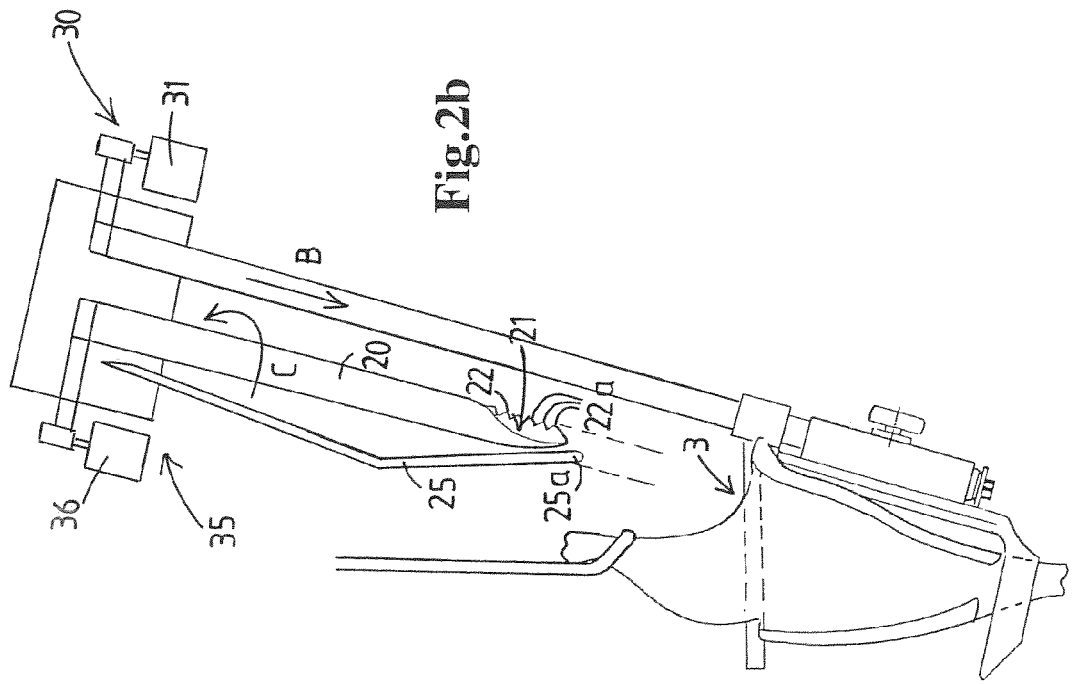
Figure 2B:
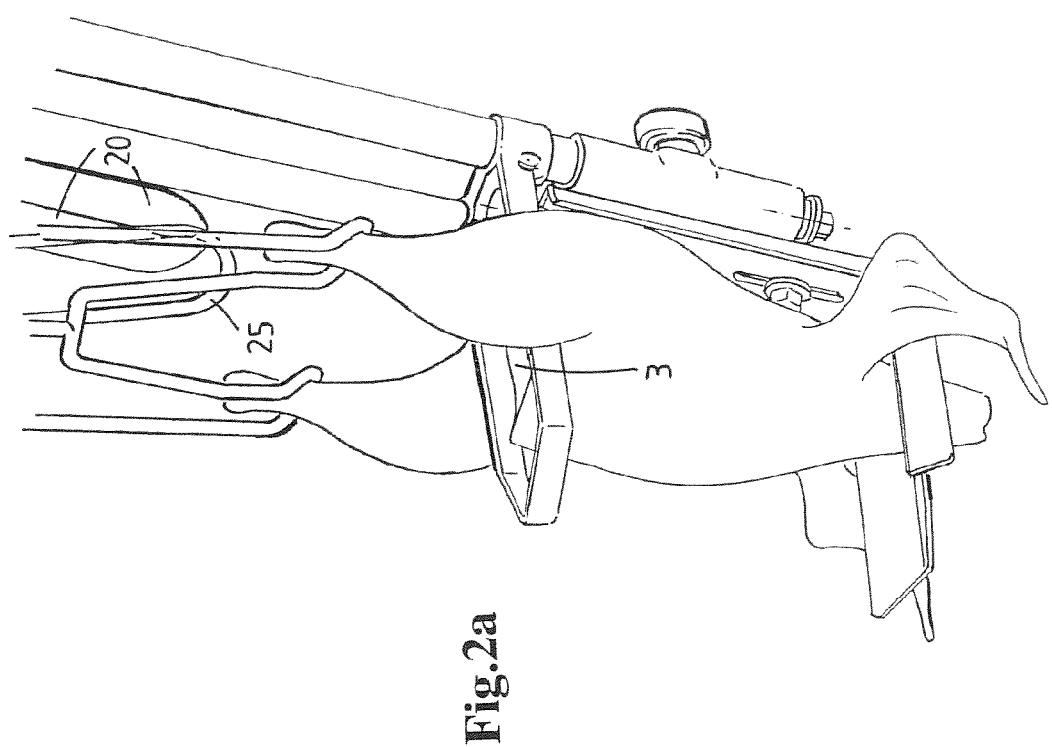
Figure 3B:
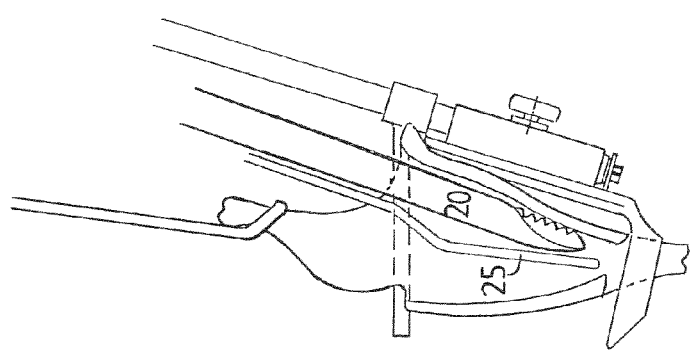
Figure 3A:
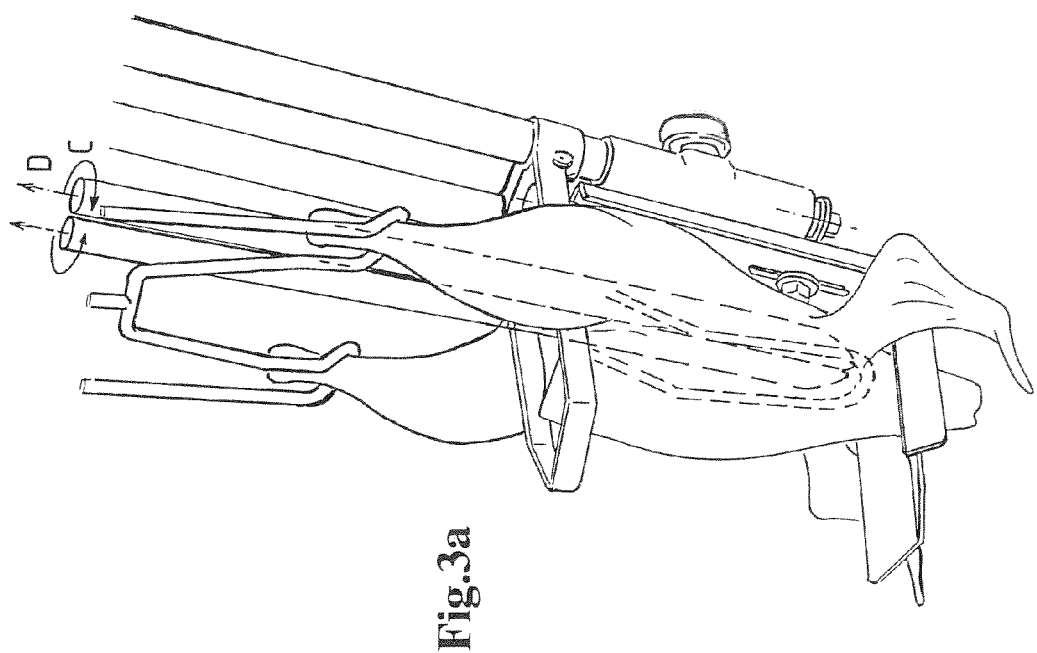

In FIGS. 1-3 an organ removal device 10 according to the invention is shown at subsequent stages of organ removal. A slaughtered eviscerated poultry 1 is hung by its legs 1a in a conventional leg hook 2. The poultry has an access opening 3 to the body cavity thereof. In the body cavity one or more organs to be removed are located adjacent the spinal column 5 of the carcass on opposite sides thereof. In FIGS. 1b, 2b, 3b, the spinal column 5 and breastbone 1d which is located opposite the spinal column 5 in the body cavity are schematically indicated.

The organ removal device 10 comprises a poultry support device for supporting and positioning the access opening and the spinal column 5 of the poultry. In the shown embodiment the poultry support device comprises a leg spreader 11, to spread the legs 1a of the poultry and clear the area of the access opening, and shoulder guides 12, to guide the shoulders adjacent wings 1b of the suspended poultry. A portion of the neck 1c of the suspended poultry is visible between the shoulder guides 12. The combination of spreader 11 and shoulder guides 12 ensures accurate positioning of the spinal column and access opening of the suspended poultry. As is visible in FIG. 1a, the poultry is allowed to enter the organ removal device 10 in direction A, from a position shown in dotted lines to the position shown in solid lines.

Alternative (not shown) poultry support devices are also conceivable, e.g. when the poultry is not hung by its legs but supported, or without a shoulder guide, e.g. when the wings and shoulders have been remover prior to the organ removal device.

The spreader 11 and shoulder guides 12 are supported by a support 13 of the organ removal device. In the shown embodiment, an adjustment mechanism 12a is provided to adjust the position of the shoulder guides 12 relative to the spreader 11, which is advantageous when the organs of poultry of different sizes are to be removed. For example, the device is suitable to remove organs of chickens, hens and turkeys.

In FIGS. 2a and 2b two vacuum tubes 20 of the organ removal device 10 are visible. Both vacuum tubes 20 comprise a nozzle 21 (only one of which is visible in FIG. 2b) at the end. Further, both vacuum tubes 20 comprise and a scraper 22, here provided at the tube portion defining the nozzle (thus also only one scraper is visible). Thus, the scrapers 22 are provided stationary with respect to the vacuum tubes 20. The scrapers are spaced apart for disposition on opposite sides of the spinal column, and are suitable for scraping the one or more organs from the wall of the body cavity and directing the detached organs into the vacuum tube. The teeth 22a of the scrapers are spaced apart, at a distance approximately equal to the distance between the ribs of the poultry. As such, damage of the ribs is prevented even further and organ removal is further optimized.

In the shown embodiment, the protrusions face the back of the poultry in the direction of the spinal column. This is less preferred, as the scrapers may damage organs and ribs at the back wall during entry. It is preferred that the vacuum tubes with the scrapers face each other during access of the body cavity through the access opening, and wherein the vacuum tubes with the protrusions sweep along the wall of the body cavity once the scrapers moved into said body cavity. When the nozzles face each other when entering the body cavity, the scrapers are prevented from scraping during entry which prevents damage of the ribs and organs prior to positioning of the vacuum nozzles.

In the shown embodiment, adjacent the vacuum tubes 20, a protective bracket 25 is provided at the side of the vacuum tubes away from the spinal column, which bracket is part of the vacuum tube assembly. The bracket 25 extends essentially parallel to and adjacent the vacuum tubes, the tip of the bracket 25a extending beyond the suction nozzles such that the tip of the bracket enters the access opening first. This facilitates entry of the vacuum tube assembly into the body cavity. The tip of the bracket 25 may push away material in front of the access opening, and as such prevents the vacuum tube from clogging before the tube has reached its position adjacent the spinal column. The bracket and vacuum tubes are being arranged such that once the vacuum tube assembly has entered the body cavity the vacuum tubes are positioned between the bracket and the spinal column. As such, the bracket 25 prevents the scrapers from contacting the opposite wall of the body cavity, opposite from the spinal column, when the scrapers rotate. Thus, the bracket 25 prevents the scrapers from scraping the wall of the body cavity in the vicinity of the breastbone. Finally, the bracket 25 may help to accurately position the vacuum tube assembly in the body cavity.

A vacuum tube actuator 30 comprising a motor unit 31 moves the vacuum tubes downwards in the direction of arrow B, and allows the nozzles to enter the body cavity through the access opening 3, as visible in FIGS. 2a, 2b, 3a and 3b. The vacuum tube actuator 30 may subsequently move the vacuum tubes out of the body cavity in the direction D, shown in FIG. 3a.

A source of vacuum pressure (not shown) is allowed to communicate with the vacuum tubes when they have entered the body cavity to impart suction to the one or more organs via the nozzles.

According to the invention, a sweeping mechanism 35 is provided for sweeping the scrapers away and/or towards the spinal column. In the shown embodiment the sweeping mechanism 35 comprises a motor unit 36, providing a rotational motion, indicated with arrow C, to the vacuum tubes at which the scrapers are provided. Thus, by rotating the vacuum tubes about a rotation axis corresponding to the longitudinal axis of the vacuum tubes 20, both the nozzles 21 and the scrapers 22 are allowed to rotate in a direction essentially perpendicular to the spinal column, allowing the scrapers to move along the ribs of the poultry.

In FIGS. 4a-4c an alternative embodiment of two vacuum tubes 50 is visible. Similar to the embodiment of FIGS. 1-3 each vacuum tube comprises a nozzle 51 at the end and a scraper 52, here provided at the tube portion defining the nozzle. The scrapers are spaced apart for disposition on opposite sides of the spinal column, and are suitable for scraping the one or more organs from the wall of the body cavity and directing the detached organs into the vacuum tube in the direction E. The teeth 52a of the scrapers are spaced apart, at a distance approximately equal to the distance between the ribs of the poultry.

The vacuum tube is allowed to enter and exit the body cavity in the direction K, indicated in FIG. 4b.

Different from the embodiment of FIGS. 1-3, the vacuum tube 50 comprises a curved end portion 50a, curved over its length, which is advantageous to reach the organs adjacent the ribs. In this embodiment, the scrapers 52 are provided stationary with respect to the vacuum tubes 50 and a sweeping mechanism is provided for rotating the vacuum tubes 50 with the scrapers 52 away and/or towards the spinal column to detach at least part of the organs from the wall of the body cavity once the scrapers moved into said body cavity. This embodiment with the curved end portion 50a requires a rotation axis of the vacuum tubes 50 different from the longitudinal axis of the non-bent portion of the vacuum tube. Preferably, the rotation axis of the sweeping mechanism is adjacent the spinal column such that the scrapers move along the wall of the body cavity. This is schematically indicated in FIG. 4b, in which the rotation is indicated with the letter L and the rotation axis is indicated in a dotted line 59. Preferably, the nozzles 51 with scrapers 52 face each other during entry of the body cavity, and rotate to the position shown in FIG. 4b only when the vacuum tube assembly has fully entered the body cavity. The position of FIG. 4b can be considered a starting position, after which the nozzles 51 and scrapers 52 are allowed to rotate in an opposite outward direction; such that each nozzles and the attached scrapers move from the spinal column in the direction of the breastbone, to an extent of maximum 180°, more preferable less, e.g. 100°.

Figure 5B:
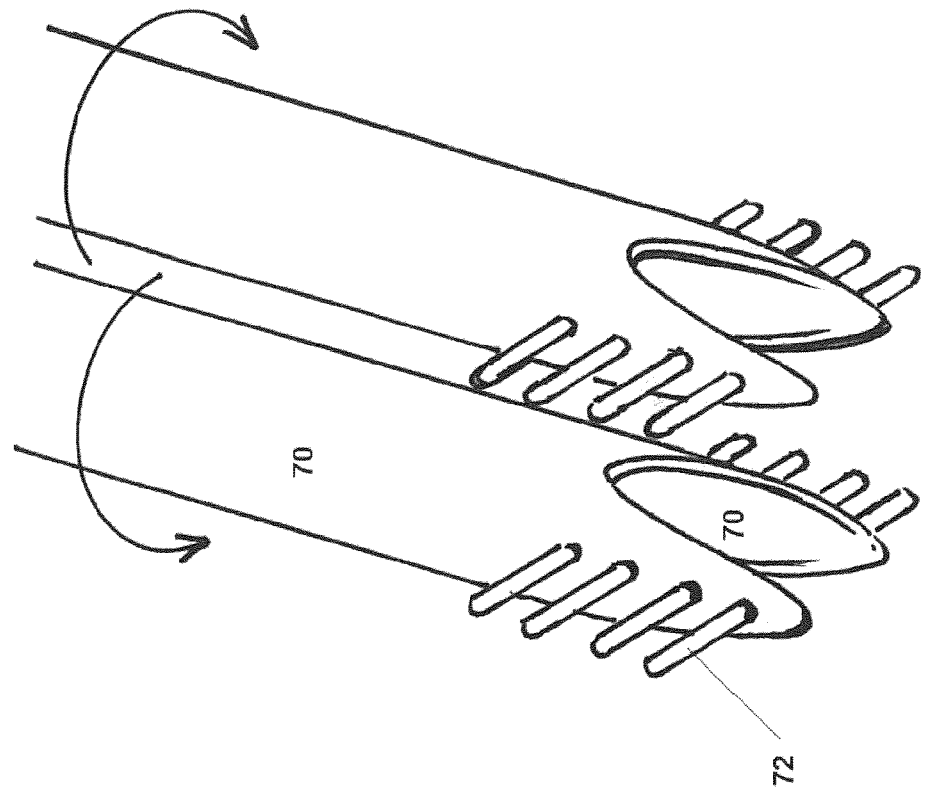
FIGS. 5a, 5b show yet alternative configurations of a vacuum tube.
Figure 5A:
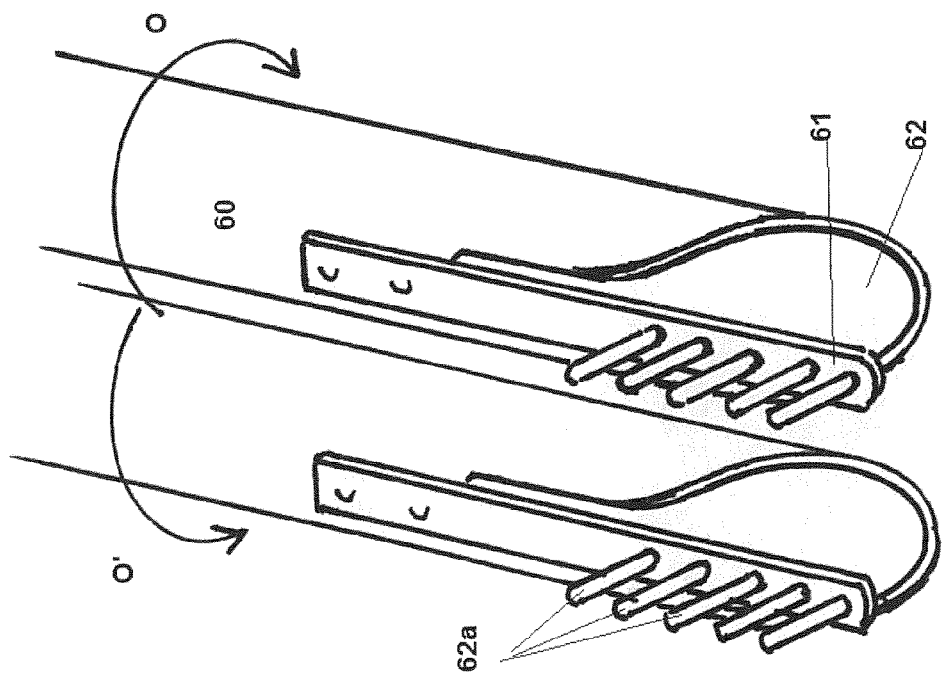

In FIGS. 5a and 5b alternative embodiments of vacuum tubes 60, 70 are shown, which are suitable to be used in the apparatus shown in FIGS. 1-3. Similar to the embodiments of FIGS. 1-4, in the embodiment of FIG. 5a two vacuum tubes 60 are provided, comprising nozzles 61 at the end and scrapers 62 comprising protrusions 62a which are attached to the vacuum tubes 60, and thus provided stationary with respect to the vacuum tube 60. According to the invention, the sweeping mechanism rotates the vacuum tube for sweeping the scrapers 62.

The sweeping mechanism sweeps the protrusions 62a of scrapers 62 in opposite directions O and O', essentially perpendicular to the spinal column, from the spinal column towards the sides, to detach at least part of the organs from the wall of the body cavity once the scrapers moved into said body cavity. It is preferred that the sweeping mechanism has rotated the vacuum tubes before entry of the body cavity such that protrusions 62a of scrapers 62 face each other and cannot scrape during entering the body cavity.

In the embodiment of FIG. 5b the vacuum tubes 70 comprise nozzles 71 and scrapers 72, the scrapers 72 comprising protrusions 72a extending in opposite directions.

In FIGS. 6a-6c yet alternative embodiments of vacuum tubes according to the invention are shown, which are also suitable to be used in the apparatus shown in FIGS. 1-3.

In each of the embodiments of FIGS. 6a-6c, two vacuum tubes 80 are provided, each tube comprising a nozzle 85 and a scraper 84a, 84b, 84c in front of the nozzle.

All scrapers 84a-84c comprise protrusions sweeping along the wall of the body cavity once the scrapers moved into said body cavity. It is preferred for the scrapers not to scrape during entering the body cavity and which protrusions. This may be achieved by positioning the scrapers 84b facing each other, or scrapers 84c essentially parallel to the nozzle. Scrapers 84a may be shielded by a shield (not shown) covering the bristles of these scrapers.

In the embodiments of FIGS. 6a and 6b, each scraper is rotatably attached to the vacuum tube via connection means 81, such that the scrapers are positioned adjacent the nozzle(s). In the embodiment of FIG. 6c, the scrapers are both rotatably attached to a frame 82, which is attached to a frame part 83 of the vacuum tube assembly. As such, it is both possible to rotate the scrapers with respect to the vacuum tubes, but it is also possible to fixate or rotate the vacuum tubes 80 independently of the scrapers 84c.

The sweeping mechanism according to the invention allows the scrapers to rotate in opposite directions indicated with the letters X and Y and thus sweep away and/or towards the spinal column, to detach at least part of the organs from the wall of the body cavity once the scrapers moved into said body cavity. The vacuum tube is thus not affected by the sweeping mechanism.

In FIGS. 7a and 7b an alternative embodiment of an organ removal device 100 according to the invention is shown, in particular a vacuum tube assembly comprising two vacuum tubes 101, 102, each comprising a suction nozzle 103, 104 respectively at the end thereof. The vacuum tube assembly further comprises two scrapers 105, 106, each arranged to scrape along a region of the wall of the body cavity to loosen organs adhering to said wall, said regions being located on opposite side of the spinal column. The scrapers 105, 106 are provided adjacent the nozzles 103, 104 respectively. The scrapers 105, 106 are supported by a scrapers carrier 107 which is part of the vacuum tube assembly, in the shown embodiment via parallelograms 108, visible in FIG. 8b.

The sweeping mechanism 109 is able to impart to each scraper a translational sweeping motion away and/or towards the spinal column. In the shown embodiment, the sweeping mechanism comprises a vacuum operated cylinder 109, comprising a vacuum port 111 and a return spring 110.

The vacuum tube assembly further comprises a protective bracket 115, similar to bracket 25, extending beyond the tips of the vacuum tube and the scrapers. The purpose of the bracket 25 is to facilitate entry of the vacuum tube assembly into the body cavity. The bracket 25 may push away material in front of the access opening. Further, the bracket 25 prevents the scrapers from contacting the opposite wall of the body cavity, opposite from the spinal column, when the scrapers rotate. Thus, the bracket 25 prevents the scrapers from scraping the wall of the body cavity in the vicinity of the breastbone. Finally, the bracket 25 may help to accurately position the vacuum tube assembly in the body cavity.

In FIGS. 8-12 an organ removal device 200 according to the present invention is shown. Corresponding parts are indicated with the same reference numbers. In the shown embodiment, the organ removal device 200 comprises a frame 205 to which a spreader 210 for supporting and positioning the access opening to the body cavity of slaughtered eviscerated poultry is fixed. The spreader is part of a poultry support device, which preferably, but not shown, further comprises shoulder guides to guide the shoulders adjacent wings of the suspended poultry.

The organ removal device 200 further comprises a vacuum tube assembly 220 comprising two vacuum tubes 221, 222, each having a suction nozzle 221a, 222a at an end thereof. According to the invention, the vacuum tube assembly 220 further comprises two scrapers, each arranged to scrape along a region of the wall of the body cavity to loosen organs adhering to said wall, said regions being located on opposite sides of the spinal column. In the shown embodiment, the scrapers 221b and 222b are formed as a part of the vacuum tubes 221, 222, the scrapers thereby defining part of the nozzles 221a, 222a.

As is preferred, the vacuum tube assembly 220 of the shown embodiment further comprises a bracket 223 extending essentially parallel to and adjacent the vacuum tubes 221, 222, the tip of the bracket 223a extending beyond the suction nozzles 221a, 222a, such that the tip of the bracket enters the access opening first, the bracket 223 and vacuum tubes 221, 222 being arranged such that once the vacuum tube assembly 220 has entered the body cavity the vacuum tubes are positioned between the bracket and the spinal column. This ensures the supply of air, compensating for the air removed during vacuum suction.

The vacuum tube assembly 220 is moveably attached to the frame 205 of the organ removal device 200.

The organ removal device 200 comprises a vacuum tube assembly actuator 230 for moving the vacuum tube assembly 220 along the frame 205 into and out of the body cavity through said access opening and through the spreader 210. As is visible in FIG. 8, the vacuum tube actuator 230 comprises a protrusion 231 which may be guided by a guide (not shown) of the organ removal device. As such, movement of the vacuum tube assembly 220 is controlled. Alternative actuators are also conceivable.

A source of vacuum pressure communicating with the vacuum tubes is not shown in this embodiment.

According to the invention, a sweeping mechanism 240 is provided to impart to each scraper a sweeping motion away and/or towards the spinal column. In the shown embodiment, see in particular FIGS. 11, 12, the sweeping mechanism 240 comprises protrusions 241a, 241b, being provided at the suction tubes 221, 222 respectively. These protrusions can slide within recesses 242a of a guide member 242. The guide member 242, similar to vacuum tube actuator 230, is moveably attached to the frame 205 of the organ removal device 200. The guide member 242 comprises a protrusion 243 which may be guided by a guide (not shown) of the organ removal device. As such, the distance between the guide member 242 and the vacuum tube assembly 220 can be increased, as a result of which the protrusions 241a, 241b slide within the guide member 242, resulting in a rotation of the vacuum tubes and thus of the scrapers.

By rotating both suction tubes about a vertical axis, the nozzles and scrapers are rotated as a result of which the scrapers are, in this embodiment, swept away from the spinal column. As such, a scraping motion is imparted in the direction of the ribs as a result of which organ removal, such as the removal of lungs from the body cavity, is facilitated.

In FIG. 8a the organ removal device 200 is visible wherein the sweeping mechanism 240 is in an entry modus. In this modus, the sweeping mechanism has positioned the scrapers 221b, 222b such that they do not scrape during entering the body cavity. The teeth of the scrapers face each other as the nozzles 221a, 222a are rotated towards each other. This is shown in an enlarged view in two different perspectives in FIGS. 8b and 8c.

In FIG. 9 the organ removal device 200 of FIG. 8 is in a configuration corresponding to the situation where the vacuum tube assembly has entered the body cavity of the poultry (not shown) through the spreader 210. The scrapers 221b, 222b are still in the entry position of FIG. 8. The vacuum tube assembly is allowed to enter the body cavity until the suction tubes are aligned with the position of the lungs in the body cavity. This position can accurately be determined with the aid of shoulder guides (not shown) guiding the shoulders adjacent wings of the suspended poultry.

Once the vacuum tube assembly 220 has fully entered the body cavity the scrapers are rotated to an operational modus wherein the sweeping mechanism imparts to each scraper a sweeping motion. This is visible in FIGS. 10a and even better in FIG. 10b, in which the bracket 223 is left out for clarity reasons. The nozzles and scrapers rotate outwards from the spinal column in the direction of the breastbone, thereby moving the scrapers along the ribs close to the spinal column into the organs to be removed. During scraping, the source of vacuum pressure is activated to remove the scraped organs. The vacuum can be imparted to both tubes simultaneously or alternatively.

The sweeping motion can be a single sweep, or alternatively a repeated sweeping motion of the scrapers.

After the removal of the organs the vacuum tube assembly is moved out of the body cavity of the poultry.

In FIGS. 11 and 12 the vacuum tubes 221, 222 are rotated until the protrusions 241a, 242b reached the end of guides 242a, 242b respectively. The scrapers have rotated as far away from the spinal column as allowed in this embodiment, and as such scraped away the lungs and possibly other organs from the body cavity.

In FIGS. 13a-13d an example of a sweeping motion according to the present invention is schematically shown. The body cavity 301 of a slaughtered eviscerated poultry is shown in cross section. Ribs 306 are visible, as well as the spinal column 305. In the body cavity 301 are two lung cavities 304, comprising lungs 303.

Two vacuum tubes 302, 307 are visible, each comprising a scraper 312, 317 respectively. The vacuum tubes 302, 307 are rotatable towards each other in directions X, Y respectively. As such, a rotation of the vacuum tubes results in a sweeping motion of the scrapers towards and away from the spinal column 305. Thus, the sweeping mechanism according to the invention in this embodiment corresponds to a rotation of the vacuum tubes 302, 307.

Figure 13A:
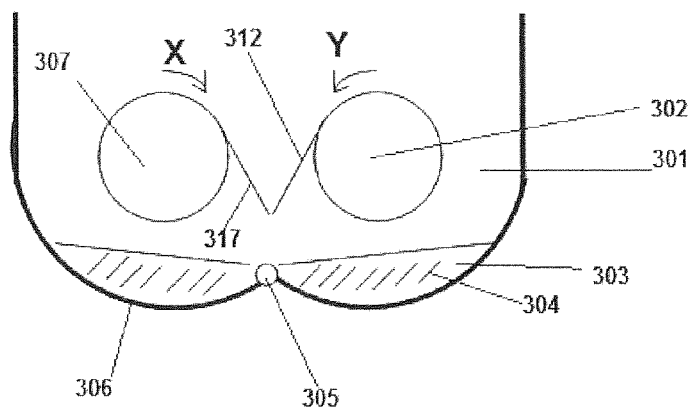

In FIG. 13A the scrapers 302, 307 are shown in an entry modus wherein the scrapers are positioned such that they do not scrape during entering the body cavity. The scrapers 312, 317 face each other and do not extend beyond the footprint of the vacuum tubes.

Figure 13B:
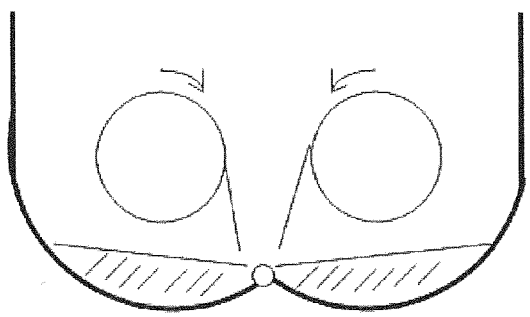

In FIG. 13B the scrapers have rotated towards the spinal column 305, and are just about to enter the lung cavities 304. The scrapers are not to contact the spinal column, to prevent damage. This entry modus in which no scraping takes place is preferably maintained until the scrapers and the nozzles have fully entered the body cavity, in the lowermost portion (poultry hanging upside down) adjacent the neck.

Figure 13C:
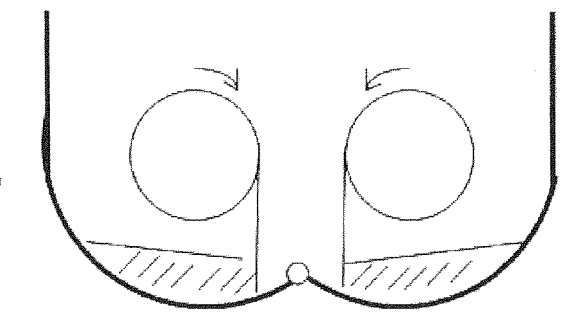
Figure 13D:
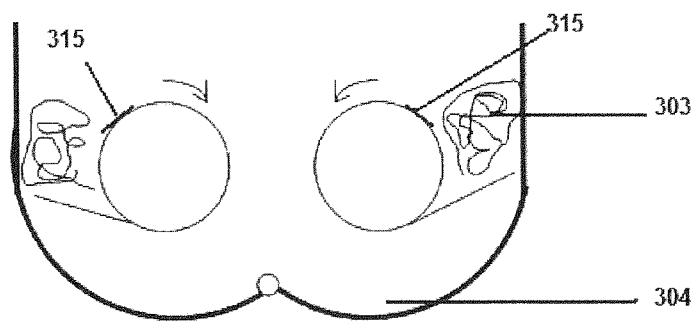

In FIGS. 13c and 13d, the operational modus of the scrapers is visible wherein the sweeping mechanism imparts to each scraper a sweeping motion away from the spinal column, in the direction of the ribs, thereby scraping the lungs from the ribs as visible in FIGS. 13c and 13d.

In FIG. 13d the end of the sweeping motion is visible, wherein the scrapers have moved outwardly to a maximum extent (for this embodiment) and removed the lungs 303 from the lung cavities. With reference number 315 schematically the suction nozzles of the vacuum tubes are represented. Once the vacuum is imparted to the suction nozzles 315 in the situation shown in FIG. 13D, the lungs will be removed from the body cavity.

In FIG. 14 yet an alternative configuration of a vacuum tube assembly 401 and a sweeping mechanism 410 according to the invention is shown. The vacuum tube assembly 401 comprises two vacuum tubes 402, 403, each having a suction nozzle 402a, 403a at one end thereof. The scrapers are not visible. Neither is a poultry support device shown. The sweeping mechanism 410 adapted to impart to each scraper a sweeping motion away and/or towards the spinal column is in this embodiment a pneumatic mechanism.

The invention claimed is:

1. An organ removal device for removing one or more organs or parts thereof located adjacent a spinal column of a carcass on opposite sides thereof from a wall of a body cavity of slaughtered eviscerated poultry, the poultry having an access opening to the body cavity thereof, said device comprising:
a poultry support device configured to support and position the access opening and the spinal column of the poultry;
a vacuum tube assembly, said vacuum tube assembly comprising:
two vacuum tubes, each of said two vacuum tubes having at least one suction nozzle at an end thereof; and
two scrapers, each of said two scrapers being provided adjacent the at least one suction nozzle of a respective vacuum tube and being arranged to scrape along a region of the wall of the body cavity to loosen organs adhering to the wall of the body cavity, the regions being located on opposite sides of the spinal column;
a vacuum tube assembly actuator for moving the vacuum tube assembly into and out of the body cavity through the access opening;
a source of vacuum pressure communicating with the two vacuum tubes to suck the one or more organs via the suction nozzles into the two vacuum tubes; and
a sweeping mechanism adapted to impart to each of said two scrapers a sweeping motion away and/or towards the spinal column.

2. The device according to claim 1, wherein the sweeping mechanism is movable between an entry modus, wherein the scrapers are positioned such that they do not scrape while entering the body cavity, and an operational modus once the scrapers have moved into said body cavity.

3. The device according to claim 2, wherein each of the two scrapers comprises protrusions at essentially a same distance as a distance between ribs of the poultry, and wherein the ribs are allowed to align with valleys between the protrusions.

4. The device according to claim 3, wherein the vacuum tubes face each other during entry of the body cavity.

5. The device according to claim 1, wherein each scraper is provided stationary with respect to an associated vacuum tube, and wherein the sweeping mechanism is adapted to rotate the vacuum tubes for sweeping the scrapers.

6. The device according to claim 5, wherein the vacuum tubes are curved over a length thereof and wherein a rotation axis of the sweeping mechanism is adjacent the spinal column.

7. The device according to claim 1, wherein the two scrapers are movably attached to the two vacuum tubes, respectively, and the sweeping mechanism drives the two scrapers.

8. The device according to claim 1, wherein each of the two scrapers comprises protrusions at essentially a same distance as a distance between ribs of the poultry, and wherein the ribs are allowed to align with valleys between the protrusions.

9. The device according to claim 1, wherein the sweeping mechanism imparts a translational movement to the two scrapers.

10. The device according to claim 1, wherein the source of vacuum alternates the communication with the two vacuum tubes.

11. The device according to claim 1, wherein the vacuum tube assembly further comprises a bracket extending essentially parallel to and adjacent the two vacuum tubes, a tip of the bracket extending beyond the suction nozzles such that the tip of the bracket enters the access opening first, the bracket and the two vacuum tubes being arranged such that once the vacuum tube assembly has entered the body cavity the two vacuum tubes are positioned between the bracket and the spinal column.

12. A method for removing one or more organs or parts thereof located adjacent a spinal column of a carcass on opposite sides thereof from a wall of a body cavity of slaughtered eviscerated poultry, the poultry having an access opening to the body cavity thereof, said method comprising the steps of:
   using the organ removal device according to claim 1;
   positioning the access opening and the spinal column of the poultry by the poultry support device;
   allowing the vacuum tube assembly comprising the two vacuum tubes and the two scrapers to access the body cavity through the access opening, such that the two scrapers are disposed on opposite sides of the spinal column;
   imparting suction to the one or more organs via the suction nozzles;
   imparting a sweeping motion away and/or towards the spinal to each of the two scrapers, the scrapers scraping along a region of the wall of the body cavity to loosen organs adhering to the wall, the regions being located on opposite sides of the spinal column; and
   allowing the vacuum tube to exit the body cavity.

13. The method according to claim 12, wherein said step of imparting a sweeping motion is repeated.

14. The method according to claim 12, wherein each of the two scrapers comprises protrusions at essentially a same distance as a distance between ribs of the poultry, said method further comprising the step of aligning the ribs with valleys between the protrusions.

15. The method according to claim 12, wherein each of the two scrapers comprises protrusions, said method further comprising the steps of:
   not scraping with the protrusions while entering the body cavity; and
   sweeping the protrusions along the wall of the body cavity once the two scrapers are moved into the body cavity to scrape with the protrusions.

16. The method according to claim 15, further comprising the steps of:
   keeping each of the two scrapers stationary with respect to an associated vacuum tube;
   rotating the two vacuum tubes with the sweeping mechanism to sweep the two scrapers;
   facing the two vacuum tubes towards each other during access of the body cavity through the access opening; and
   sweeping the two vacuum tubes with the protrusions along the wall of the body cavity once the scrapers are moved into said body cavity.

17. The method according to claim 12, further comprising the step of alternating the communication of the source of vacuum with the two vacuum tubes to optimize performance.

* * * * *